(12) United States Patent
Nakai et al.

(10) Patent No.: US 10,526,038 B2
(45) Date of Patent: Jan. 7, 2020

(54) OPERATING DEVICE

(71) Applicant: Shimano Inc., Sakai, Osaka (JP)

(72) Inventors: Mototsugu Nakai, Osaka (JP); Kohei Obuchi, Osaka (JP); Natsuki Noma, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/871,541

(22) Filed: Jan. 15, 2018

(65) Prior Publication Data

US 2019/0039679 A1 Feb. 7, 2019

Related U.S. Application Data

(63) Continuation-in-part of application No. 15/667,914, filed on Aug. 3, 2017.

(51) Int. Cl.
| | |
|---|---|
| *B62L 3/02* | (2006.01) |
| *B62K 23/06* | (2006.01) |
| *B60T 13/14* | (2006.01) |
| *B60T 7/10* | (2006.01) |
| *B60T 11/18* | (2006.01) |
| *B60T 11/16* | (2006.01) |

(52) U.S. Cl.
CPC .............. *B62K 23/06* (2013.01); *B60T 7/102* (2013.01); *B60T 11/16* (2013.01); *B60T 11/18* (2013.01); *B60T 13/142* (2013.01); *B62L 3/023* (2013.01)

(58) Field of Classification Search
CPC ......... B62K 23/06; B62K 19/38; B62L 3/023; B62L 3/02; B62M 25/04

USPC ......................................................... 188/344
See application file for complete search history.

(56) References Cited

U.S. PATENT DOCUMENTS

| | | |
|---|---|---|
| 4,560,049 A | 12/1985 | Uchibaba et al. |
| 4,840,082 A | 6/1989 | Terashima et al. |
| 6,336,525 B1 * | 1/2002 | Leng ................. B62L 1/00 188/24.19 |
| 6,739,133 B2 | 5/2004 | Barnett |
| 6,871,729 B2 | 3/2005 | Huster et al. |
| 7,100,751 B2 | 9/2006 | Lavezzi |

(Continued)

FOREIGN PATENT DOCUMENTS

| | | | |
|---|---|---|---|
| DE | 20 2014 000 348 U1 | 5/2014 | |
| EP | 0100179 A1 * | 2/1984 | .............. B62L 3/023 |

(Continued)

*Primary Examiner* — Thomas W Irvin
(74) *Attorney, Agent, or Firm* — Global IP Counselors, LLP (57) ABSTRACT

An operating device for a handlebar steered vehicle is basically provided with a base member, an operating member and a handlebar fixing structure. The base member includes a support abutment arranged to contact an outer surface of a handlebar while the operating device is in an installed state. The operating member is pivotally coupled to the base member about a pivot axis. The handlebar fixing structure is coupled to base member. The handlebar fixing structure defines a handlebar arrangement area extending along a handlebar axis. The support abutment being spaced from the handlebar receiving area of the handlebar fixing structure in a handlebar axis direction parallel to the handlebar axis by an axial width with a range from ten millimeters to thirty millimeters.

20 Claims, 4 Drawing Sheets

(56) References Cited

U.S. PATENT DOCUMENTS

| | | | | |
|---|---|---|---|---|
| 7,137,492 B2* | 11/2006 | Laghi | ............ | B60T 11/22 |
| | | | | 188/344 |
| 7,197,875 B2* | 4/2007 | Henifin | ............ | B60T 11/22 |
| | | | | 60/584 |
| 7,360,632 B2* | 4/2008 | Laghi | ............ | B60T 11/22 |
| | | | | 188/344 |
| 7,530,435 B2* | 5/2009 | Lumpkin | ............ | B60T 7/102 |
| | | | | 188/344 |
| 7,823,713 B1* | 11/2010 | Overton | ............ | F16D 43/12 |
| | | | | 192/103 A |
| 8,905,205 B2* | 12/2014 | Matsushita | ............ | B62K 23/06 |
| | | | | 188/344 |
| 9,187,150 B2* | 11/2015 | Miki | ............ | B62M 25/04 |
| 9,365,260 B2* | 6/2016 | Nago | ............ | B62L 3/023 |
| 9,463,841 B2* | 10/2016 | Kawakami | ............ | B60T 7/102 |
| 9,937,978 B2* | 4/2018 | Miki | ............ | B62K 23/06 |
| 10,144,483 B2* | 12/2018 | Miki | ............ | B62M 25/04 |
| 2002/0070084 A1 | 6/2002 | Chou | | |
| 2004/0045775 A1 | 3/2004 | Lavezzi | | |
| 2014/0060986 A1 | 3/2014 | Miles | | |
| 2015/0000452 A1* | 1/2015 | Hirotomi | ............ | B62K 23/06 |
| | | | | 74/488 |
| 2016/0257372 A1* | 9/2016 | Nakai | ............ | B62L 3/023 |
| 2019/0225299 A1* | 7/2019 | Komada | ............ | B62K 23/06 |

FOREIGN PATENT DOCUMENTS

| | | |
|---|---|---|
| EP | 0 764 574 A1 | 3/1997 |
| EP | 1514757 B1 | 8/2008 |
| EP | 2338778 B1 | 1/2016 |
| FR | 581 837 A | 12/1924 |
| FR | 917 581 A | 1/1947 |

\* cited by examiner

OPERATING DEVICE

CROSS-REFERENCE TO RELATED APPLICATIONS

This application is a continuation-in-part application of U.S. patent application Ser. No. 15/667,914, filed on Aug. 3, 2017. The entire disclosure of U.S. patent application Ser. No. 15/667,914 is hereby incorporated herein by reference.

BACKGROUND

Field of the Invention

This invention generally relates to an operating device for a handlebar steered vehicles including a bicycle. More specifically, the present invention relates to an operating device that can be supported on a handlebar of a handlebar steered vehicle.

Background Information

Recently, small vehicles with a handlebar for steering, in particular bicycles, have been provided with operating devices for operating various components of small vehicles. In some cases, small vehicles are provided with hydraulic operating systems such as a hydraulic brake system. The hydraulic operating systems for bicycles and other handlebar steered vehicles typically have a hydraulic operating (actuating) device that is fluidly connected to a hydraulic operated device by a hydraulic hose. The hydraulic operated device is hydraulically controlled by hydraulic fluid flowing through the hydraulic hose in response to an operation of the hydraulic operating device. For example, in the case of a hydraulic brake system, a brake caliper (i.e., the hydraulic operated device) is hydraulically controlled by hydraulic fluid flowing through the hydraulic hose in response to an operation of a brake lever of the hydraulic operating device. In particular, the operation of the brake lever forces hydraulic fluid through the hydraulic hose to the brake caliper. The hydraulic fluid then moves one or more pistons to cause the brake pads to squeeze a brake rotor that is attached to a hub of a bicycle wheel.

SUMMARY

Generally, the present disclosure is directed to various features of an operating device for a small vehicle including a bicycle. Bicycles as used herein refers to conventional bicycles driven by human power only, and assisted bicycles driven by both human power and assistance electric power in accordance with necessity. Recently, such assisted bicycles are called as e-bike. Small vehicles as used herein refers to electric and non-electric vehicles regardless of the number of their wheels, but does not include four wheeled vehicles having an internal combustion engine as a power source for driving the wheels, or four wheeled electric vehicles that require a license to operate on public roads. Handlebar steered vehicles as used herein refers to electric and non-electric vehicles that have a handlebar, as opposed to a steering wheel, for steering the vehicle. A straddle-type vehicle as used herein refers to electric and non-electric vehicles having a seat or saddle that a rider straddles with one leg on one side of the vehicle and the other leg on the other side of the vehicle.

In one feature, an operating device for a small vehicle (e.g., a bicycle) is provided in which it is possible to easily stabilize the operating device with respect to a handlebar.

In view of the state of the known technology and in accordance with a first aspect of the present disclosure, an operating device is provided for a handlebar steered vehicle. The operating device basically comprises a base member, an operating member and a handlebar fixing structure. The base member includes a support abutment arranged to contact an outer surface of a handlebar while the operating device is in an installed state. The operating member is pivotally coupled to the base member about a pivot axis. The handlebar fixing structure is coupled to base member. The handlebar fixing structure defines a handlebar arrangement area extending along a handlebar axis. The handlebar arrangement area includes a handlebar receiving area. The support abutment is spaced from the handlebar receiving area of the handlebar fixing structure in a handlebar axis direction parallel to the handlebar axis by an axial width with a range from ten millimeters to thirty millimeters.

With the operating device according to the first aspect, it is possible to easily stabilize the base member with respect to a handlebar by providing a support abutment that is stably in contact with the handlebar. Thus, it is possible to reduce a bending force on the handlebar fixing structure as a result of the operating force of the operating member that is directed towards the handlebar.

In accordance with a second aspect of the present invention, the operating device according to the first aspect is configured so that the handlebar receiving area of the handlebar fixing structure has an axial width with a range from ten millimeters to twenty-five millimeters as measured in the handlebar axis direction.

With the operating device according to the second aspect, it is possible for the base member to be securely supported on a handlebar.

In accordance with a third aspect of the present invention, the operating device according to the first or second aspect is configured so that the support abutment has an axial width with a range from three millimeters to eight millimeters as measured in the handlebar axis direction.

With the operating device according to the third aspect, it is possible for the support abutment to be stably in contact with the handlebar.

In accordance with a fourth aspect of the present invention, an operating device is provided for a handlebar steered vehicle. The operating device basically comprises a base member, an operating member and a handlebar fixing structure. The operating member is pivotally coupled to the base member about a pivot axis. The handlebar fixing structure is coupled to the base member. The handlebar fixing structure defines a handlebar arrangement area extending along a handlebar axis. The handlebar arrangement area includes a handlebar receiving area. The pivot axis is arranged with respect to the handlebar fixing structure to define an angle with a range from forty degrees to sixty-five degrees as measured between the handlebar axis and a line connecting the pivot axis and a center point of the handlebar receiving area and as viewed in a pivot axis direction parallel to the pivot axis.

With the operating device according to the fourth aspect, it is possible to maintain a relatively compact profile.

In accordance with a fifth aspect of the present invention, the operating device according to the fourth aspect is configured so that the range of the angle is fifty-three degrees to fifty-eight degrees.

With the operating device according to the fifth aspect, it is possible to maintain a relatively compact profile.

In accordance with a sixth aspect of the present invention, an operating device is provided for a handlebar steered vehicle. The operating device basically comprises a base member, an operating member and a handlebar fixing, structure. The operating member is pivotally coupled to the base member about a pivot axis. The handlebar fixing structure is coupled to the base member. The handlebar fixing structure defines a handlebar arrangement area extending along a handlebar axis. The pivot axis is spaced from the handlebar axis by a distance with a range from twenty-five millimeters to forty millimeters as measured in a direction perpendicular to the handlebar axis and as viewed in a pivot axis direction parallel to the pivot axis.

With the operating device according to the sixth aspect, it is possible to compactly arrange the base member and the operating member so that the user can easily operate the operating member.

In accordance with a seventh aspect of the present invention, the operating device according to the sixth aspect is configured so that the range of the distance is thirty millimeters to thirty-eight millimeters.

With the operating device according to the seventh aspect, it is possible for the user to easily operate the operating member.

In accordance with an eighth aspect of the present invention, the operating device according to any one of the fourth to seventh aspects is configured so that the base member further includes a support abutment arranged to contact an outer surface of a handlebar while the operating device is in an installed state.

With the operating device according to the eighth aspect, it is possible for the support abutment to be stably in contact with the handlebar.

In accordance with a ninth aspect of the present invention, the operating device according to any one of the first to eighth aspects is configured so that the base member includes a cylinder having a cylinder bore and a piston movably disposed in the cylinder bore. The operating member is operatively coupled to the piston to move the piston within the cylinder bore.

With the operating device according to the ninth aspect, it is possible to operate a hydraulically actuated device such as a disc brake caliper while maintaining a relatively compact profile of the operating device with respect to the handlebar.

In accordance with a tenth aspect of the present invention, the operating device according to the ninth aspect is configured so that the cylinder bore has a cylinder axis that is not perpendicular to the handlebar axis of the handlebar arrangement area as viewed in the pivot axis direction parallel to the pivot axis.

With the operating device according to the tenth aspect, it is possible to maintain a relatively compact profile.

In accordance with an eleventh aspect of the present invention, the operating device according to the ninth or tenth aspect is configured so that the cylinder bore has a cylinder axis that is not parallel to the handlebar axis of the handlebar arrangement area as viewed in a pivot axis direction parallel to the pivot axis.

With the operating device according to the eleventh aspect, it is possible to provide a space between the handlebar and the hydraulic reservoir tank so that additional components can be mounted adjacent a grip portion of the handlebar.

In accordance with a twelfth aspect of the present invention, the operating device according to any one of the ninth to eleventh aspects is configured so that the cylinder bore has a cylinder axis that diverges from the handlebar axis to form an acute angle with the handlebar axis of the handlebar arrangement area as viewed in a pivot axis direction parallel to the pivot axis, the acute angle is in a range of five degrees to twenty-five degrees.

With the operating device according to the twelfth aspect, it is possible to easily actuate the piston using the operating member.

In accordance with a thirteenth aspect of the present invention, the operating device according to any one of the ninth to twelfth aspects is configured so that the cylinder defines a hydraulic pressure chamber with a space between the piston and a fluid outlet port of the cylinder. Also, the hydraulic pressure chamber is entirely arranged opposite to the pivot axis with respect to the handlebar fixing structure.

With the operating device according to the thirteenth aspect, it is possible compactly arrange the cylinder with respect to the handlebar fixing structure.

In accordance with a fourteenth aspect of the present invention, the operating device according to any one of the ninth to thirteenth aspects is configured so that the base member includes a hydraulic reservoir tank in fluid communication with the cylinder.

With the operating device according to the fourteenth aspect, it is possible to easily provide the hydraulic fluid to the cylinder.

In accordance with a fifteenth aspect of the present invention, the operating device according to the fourteenth aspect is configured so that the hydraulic reservoir tank extends along a longitudinal axis that is not perpendicular to the handlebar axis of the handlebar arrangement area as viewed in a pivot axis direction parallel to the pivot axis.

With the operating device according to the fifteenth aspect, it is possible to compactly arrange the hydraulic reservoir tank.

In accordance with a sixteenth aspect of the present invention, the operating device according to the fourteenth or fifteenth aspect is configured so that the longitudinal axis of the hydraulic reservoir tank is not parallel to the handlebar axis of the handlebar arrangement area as viewed in the pivot axis direction.

With the operating device according to the sixteenth aspect, it is possible to provide a space between the handlebar and the hydraulic reservoir tank so that additional components can be mounted adjacent a grip portion of the handlebar.

In accordance with a seventeenth aspect of the present invention, the operating device according to any one of the fourteenth to sixteenth aspects is configured so that the hydraulic reservoir tank is offset with respect to the handlebar arrangement area as viewed in the handlebar axis direction.

With the operating device according to the seventeenth aspect, it is possible to provide a space between the handlebar and the hydraulic reservoir tank so that additional components can be mounted adjacent a grip portion of the handlebar.

In accordance with an eighteenth aspect of the present invention, the operating device according to any one of the fourteenth to seventeenth aspects is configured so that the hydraulic reservoir tank is at least partially overlapped with the cylinder bore as viewed in a pivot axis direction parallel to the pivot axis.

With the operating device according to the eighteenth aspect, it is possible to provide a hydraulic reservoir tank while maintaining a relatively compact profile of the operating device with respect to the handlebar. It is thus possible to arrange the pivot axis closer to the handlebar for easy operation of the operating member.

In accordance with a nineteenth aspect of the present invention, the operating device according to any one of the first to third aspects and any one of the eighth to eighteenth aspects is configured so that is configured so that the handlebar fixing structure, the base member and the support abutment define a gap between the base member and the handlebar as viewed in the pivot axis direction parallel to the pivot axis while the operating device is in the installed state.

With the operating device according to the nineteenth aspect, it is possible to easily stabilize the operating device with respect to the handlebar while avoiding increasing the overall weight of the operating device. Further, it is possible to provide a space between the handlebar and the base member so that additional components having a clamping structure for the handlebar can be mounted between the handlebar fixing structure and the support abutment.

In accordance with a twentieth aspect of the present invention, the operating device according to the nineteenth aspects is configured so that the gap narrows in the handlebar axis direction as the gap extends from the handlebar fixing structure towards the support abutment.

With the operating device according to the twentieth aspect, it is possible to maintain a relatively compact profile.

In accordance with a twenty-first aspect of the present invention, the operating device according to any one of the first to twentieth aspects is configured so that the handlebar fixing structure includes a first clamp part and a second clamp part. The first clamp part is hingedly connected to the second clamp part.

With the operating device according to the twenty-first aspect, it is possible to easily attach the operating device to a handlebar.

Also, other objects, features, aspects and advantages of the disclosed hydraulic operating device will become apparent to those skilled in the art from the following detailed description, which, taken in conjunction with the annexed drawings, discloses one embodiment of the operating device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the small vehicle field, in particular the bicycle field from this disclosure that the following descriptions of the embodiments are provided for illustration only and not for the purpose of limiting the invention as defined by the appended claims and their equivalents.

Figure 1:
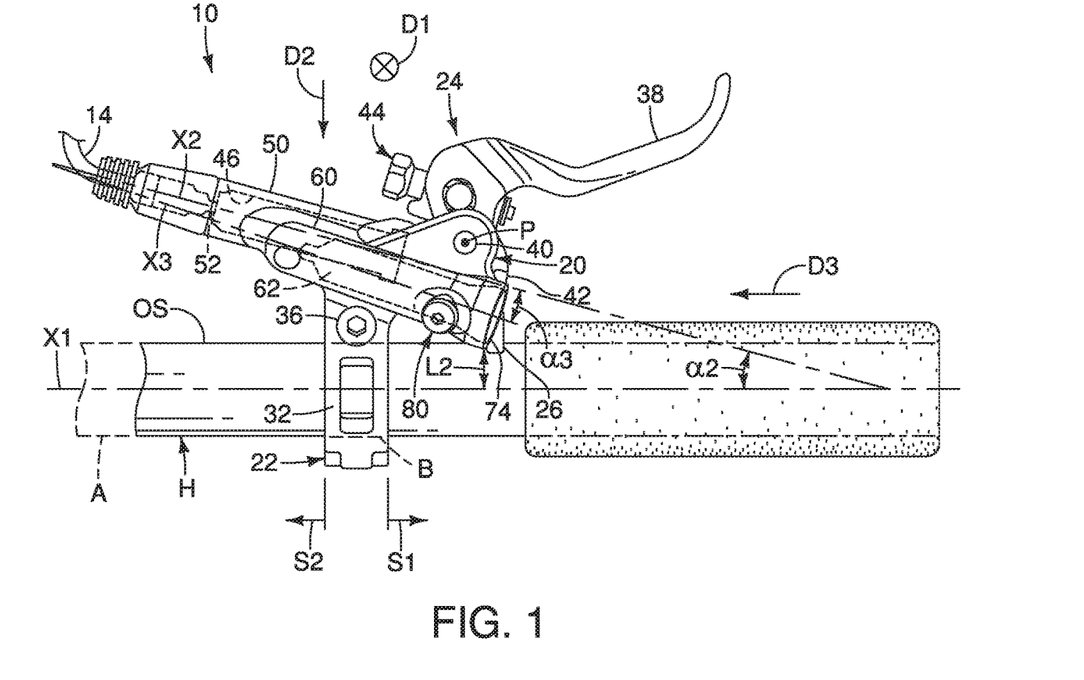
FIG. 1 is a top plan view of a portion of a handlebar equipped with a hydraulic operating device in accordance with one illustrated embodiment.
Figure 2:
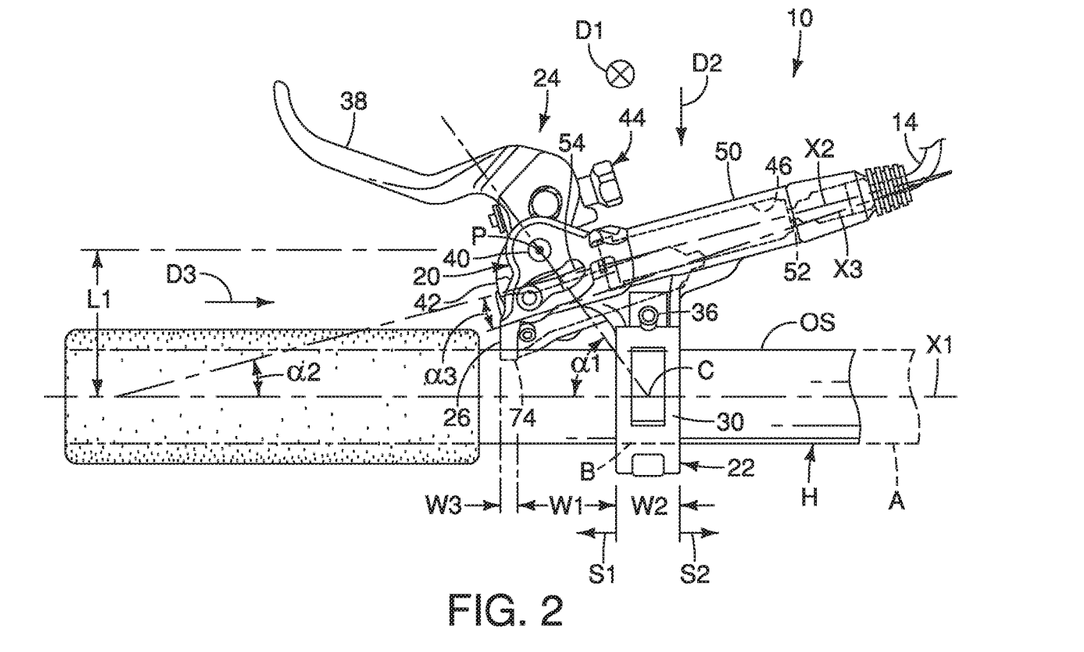
FIG. 2 is a bottom plan view of the portion of the handlebar and the operating device illustrated in FIG. 1.

Referring initially to FIGS. 1 and 2, an operating device 10 is illustrated that in accordance with one illustrative embodiment. Here, the operating device 10 is a bicycle hydraulic operating device. In more detail, the operating device 10 is a bicycle hydraulic brake operating device for operating a hydraulic operated device. Hereinafter, the operating device 10 will be referred to the hydraulic operating device 10, since the illustrated embodiment of the operating device 10 is used for operating a hydraulic operated device. The hydraulic operating device 10 is installed on a bicycle of which only a portion of a handlebar H is shown. Bicycles having this kind of handlebars are recognized as handlebar steered vehicles. The hydraulic operating device 10 is fluidly connected to the hydraulic operated device (not shown) by a hydraulic hose 14. As illustrated in FIGS. 1 and 2, the hydraulic operating device 10 is a right-hand side hydraulic brake actuating device that is operated by the rider's right hand to actuate the hydraulic operated device such as a disc brake caliper. It will be apparent to those skilled in the bicycle field that the configuration of hydraulic operating device 10 can be adapted to a left-hand side hydraulic brake actuating device that is operated by the rider's left hand. Also, the hydraulic operating device 10 can be used with other bicycle components other than a disc brake caliper.

The hydraulic operating device 10 comprises a base member 20, a handlebar fixing structure 22 and an operating member 24. In the illustrated embodiment, the hydraulic operating device 10 is mounted to the handlebar (bicycle handlebar) H by the handlebar fixing structure 22. The handlebar fixing structure 22 is coupled to the base member 20. The handlebar fixing structure 22 defines a handlebar arrangement area A including a handlebar receiving area B (FIGS. 1 and 2). The base member 20 includes a support abutment 26 that is arranged to contact an outer surface OS of the handlebar H while the hydraulic operating device 10 is in an installed state. In particular, the support abutment 26 has a curved contact surface 26a (FIG. 3) that is arranged to contact the outer surface OS of the handlebar H while the operating device 10 is in the installed state.

In the illustrated embodiment, the operating member 24 is pivotally coupled to the base member 20 about a pivot axis P. As seen in FIG. 2, the pivot axis P is arranged with respect to the handlebar fixing structure 22 to define an angle $\alpha 1$ with a range from forty degrees to sixty-five degrees as measured between the handlebar axis X1 and a line connecting the pivot axis P and a center point C of the handlebar receiving area B and as viewed in a pivot axis direction D1 that is parallel to the pivot axis P. The pivot axis direction D1 is indicated by the symbol "⊗" in FIGS. 1, 2, 4 and 5. More preferably, the range of the angle $\alpha 1$ is fifty-three degrees to fifty-eight degrees. In the illustrated embodiment, the angle $\alpha 1$ is approximately fifty-five degrees. Also, the pivot axis P is spaced from the handlebar axis X1 by a distance L1 with a range from twenty-five millimeters to forty millimeters as measured in a direction D2 that is perpendicular to the handlebar axis X1 and as viewed in the pivot axis direction D1 that is parallel to the pivot axis P. The direction D2 is indicated by the symbol "⊗" in FIGS. 6 and 7. Also, the direction D2 constitutes a first perpendicular direction D2, since the direction D2 is perpendicular to the pivot axis P of the operating member 24. In the illustrated embodiment, the first perpendicular direction D2 is perpendicular to both the pivot axis P and the handlebar axis X. More preferably, the range of the distance L1 is thirty millimeters to thirty-eight millimeters. In the illustrated embodiment, the distance L1 is approximately thirty-four or five millimeters.

As seen in FIG. 2, the support abutment 26 is spaced from the handlebar receiving area B of the handlebar fixing structure 22 in a handlebar axis direction D3 that is parallel to a handlebar axis X1 by an axial width W1 with a range from ten millimeters to thirty millimeters. In the illustrated embodiment, the handlebar axis direction D3 constitutes a second perpendicular direction D3, since the handlebar axis direction D3 is perpendicular to the pivot axis P. The handlebar receiving area B of the handlebar fixing structure 22 has an axial width W2 with a range from ten millimeters to twenty-five millimeters as measured in the handlebar axis direction D3. On the other hand, the support abutment 26 has an axial width W3 with a range from three millimeters to eight millimeters as measured in the handlebar axis direction D3. Thus, the axial width W3 of the support abutment 26 is smaller than the axial width W2 of the handlebar receiving area B of the handlebar fixing structure 22. In the illustrated embodiment, the axial width W2 is approximately sixteen millimeters. In the illustrated embodiment, the axial width W3 is approximately five millimeters.

The handlebar arrangement area A of the handlebar fixing structure 22 has a length dimension corresponding to a length dimension of the handlebar H in an axial direction and a width dimension corresponding to the diameter of the handlebar H. The handlebar arrangement area A extends along the handlebar axis X1. The handlebar axis X1 extends longitudinally along the handlebar H between opposite ends of the handlebar H. Thus, the handlebar arrangement area A coincides with the handlebar H in the fixing state.

Figure 3:
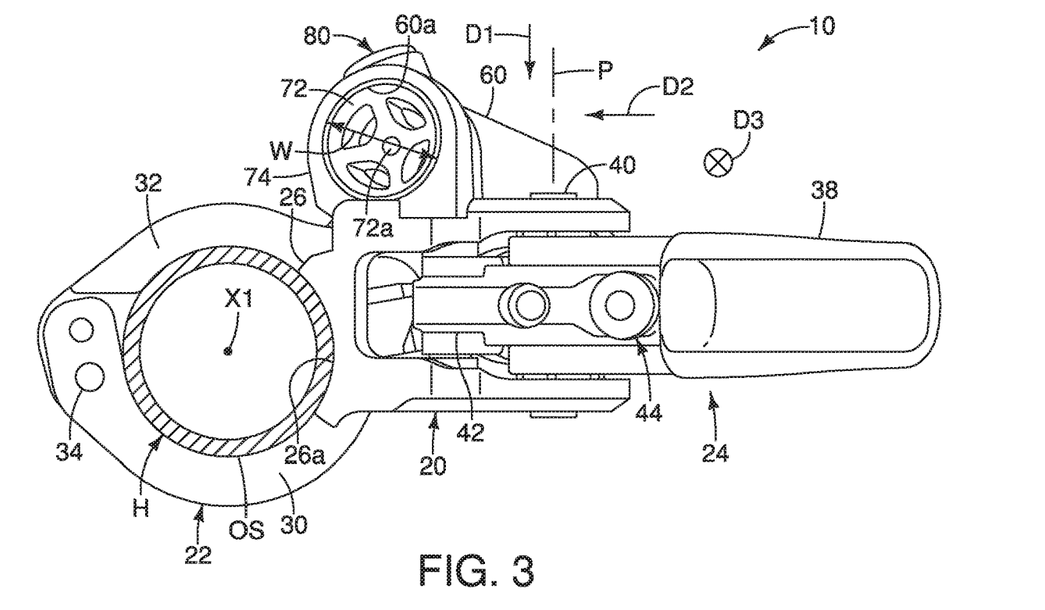
FIG. 3 is an enlarged outside end elevational view of the operating device illustrated in FIGS. 1 and 2 in which the handlebar is shown in cross section.

In the illustrated embodiment, as seen in FIG. 3, the handlebar fixing structure 22 includes a first clamp part 30 and a second clamp part 32. In more detail, the handlebar fixing structure 22 includes a handlebar clamp portion which has the first clamp part 30 and the second clamp part 32. The first clamp part 30 is hingedly connected to the second clamp part 32. Specifically, the first clamp part 30 has a first end fixed to the base member 20 and a second end hingedly connected to the second clamp part 32 by a pivot pin 34. The second clamp part 32 has a first end releasably attached to the first clamp part 30 by a fixing bolt 36 and a second end hingedly connected to the first clamp part 30 by the pivot pin 34. By tightening the fixing bolt 36, the first ends of the first and second clamp parts 30 and 32 are moved together to tighten the first and second clamp parts 30 and 32 around the handlebar H.

Figure 4:
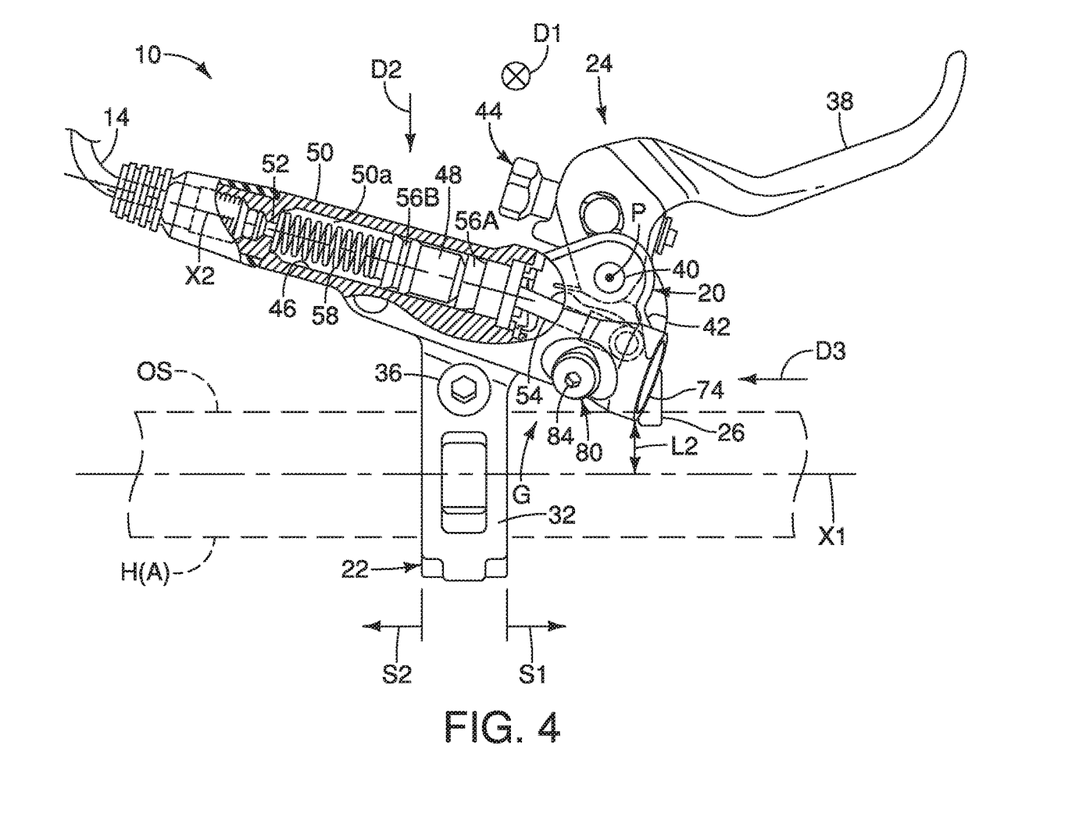
FIG. 4 is a cross-sectional view of the operating device illustrated in FIGS. 1 to 3 as taken along section plane perpendicular to a pivot axis of the brake operating (lever) member and passing through a cylinder axis of a cylinder bore provided in the base member.
Figure 5:
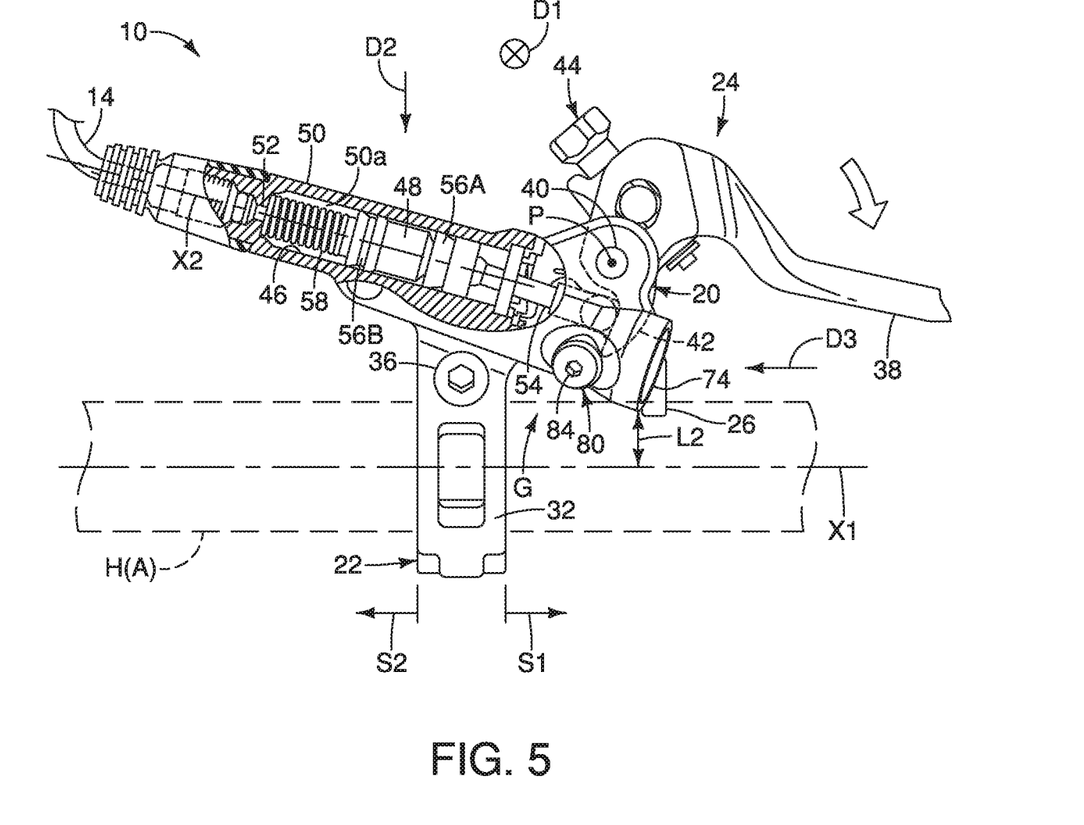
FIG. 5 is a cross-sectional view, similar to FIG. 4, of the operating device illustrated in FIGS. 1 to 4 but in which the brake operating (lever) member has been moved to an actuated position.

As seen in FIGS. 1, 2, 4 and 5, in the illustrated embodiment, the operating member 24 includes a lever 38. Here, the lever 38 is pivotally mounted relative to the base member 20 by a pivot pin 40 from a rest (non-operated) position (FIGS. 1, 2 and 4) to an operated position (FIG. 5). The pivot pin 40 defines the pivot axis P. Here, the operating member 24 also includes an actuation part 42 and a reach adjustment part 44. The actuation part 42 is pivotally mounted relative to the base member 20 by the pivot pin 40. The actuation part 42 is adjustably coupled to the lever 38 by the reach adjustment part 44, such that the lever 38 is rotated with respect to the actuation part 42. The reach adjustment part 44 is adjustable to change the relative position of the lever 38 with respect to the actuation part 42. In other words, the reach adjustment part 44 is adjustable to change a rest position or non-operated position of the lever 38 relative to the base member 20. Since reach adjustment mechanism are known and optional, the reach adjustment part 44 will not be discussed in detail herein.

The hydraulic operating device 10 further comprises a cylinder bore 46 and a piston 48. The cylinder bore 46 is provided on the base member 20. Specifically, the base member 20 includes a cylinder 50 having the cylinder bore 46. In other words, the cylinder 50 defines the cylinder bore 46. As seen in FIGS. 4 and 5, the handlebar fixing structure 22, the base member 20 (the cylinder 50) and the support abutment 26 define a gap G between the base member 20 (the cylinder 50) and the handlebar H as viewed in the pivot axis direction D1 while the operating device 10 is in the installed state. The gap G narrows in the handlebar axis direction D3 as the gap G extends from the handlebar fixing structure 22 towards the support abutment 26.

The cylinder 50 defines a hydraulic pressure chamber 50a with a space between the piston 48 and a fluid outlet port 52 of the cylinder 50. As seen in FIG. 4, in the illustrated embodiment, the hydraulic pressure chamber 50a is entirely arranged opposite to the pivot axis P with respect to the handlebar fixing structure 22. The pivot axis P of the operating member 24 is arranged such that the operating member 24 pushes the piston 48 within the cylinder bore 46 from a non-actuated position (FIG. 4) to an actuated position (FIG. 5) as the operating member 24 is actuated about the pivot axis P.

The piston 48 is movably disposed in the cylinder bore 46. The operating member 24 is operatively coupled to the piston 48 to move the piston 48 within the cylinder bore 46. The cylinder bore 46 defines a cylinder axis X2. Thus, the piston 48 moves linearly along the cylinder axis X2. In other words, here, the cylinder axis X2 is the center cylinder axis that extends in the direction of movement of the piston 48 inside of the cylinder bore 46. As seen in FIGS. 1, 2 and 4, the cylinder axis X2 is not perpendicular to the handlebar axis X1 of the handlebar arrangement area A as viewed in the pivot axis direction D1 that is parallel to the pivot axis P of the operating member 24. Also, as seen in FIGS. 1 to 4, the cylinder axis X2 is not parallel to the handlebar axis X1 of the handlebar arrangement area A as viewed in the pivot axis direction D1. The cylinder axis X2 diverges from the handlebar axis X1 of the handlebar arrangement area A in an actuation direction of the piston 48 (i.e., a left side direction in the illustrated embodiment). In particular, as seen in FIGS. 1 and 2, the cylinder axis X2 diverges from the handlebar axis X1 to form an acute angle α2 with the handlebar axis X1 of the handlebar arrangement area A as viewed in the pivot axis direction D1. Preferably, the acute angle α2 is in a range of five degrees to twenty-five degrees. In the illustrated embodiment, the angle α2 is approximately fifteen degrees. Further, the cylinder axis X2 is parallel to the handlebar axis X1 as viewed in the direction D2. More further, the cylinder axis X2 is offset from the handlebar axis X1 in the handlebar axis direction D3.

Figure 6:
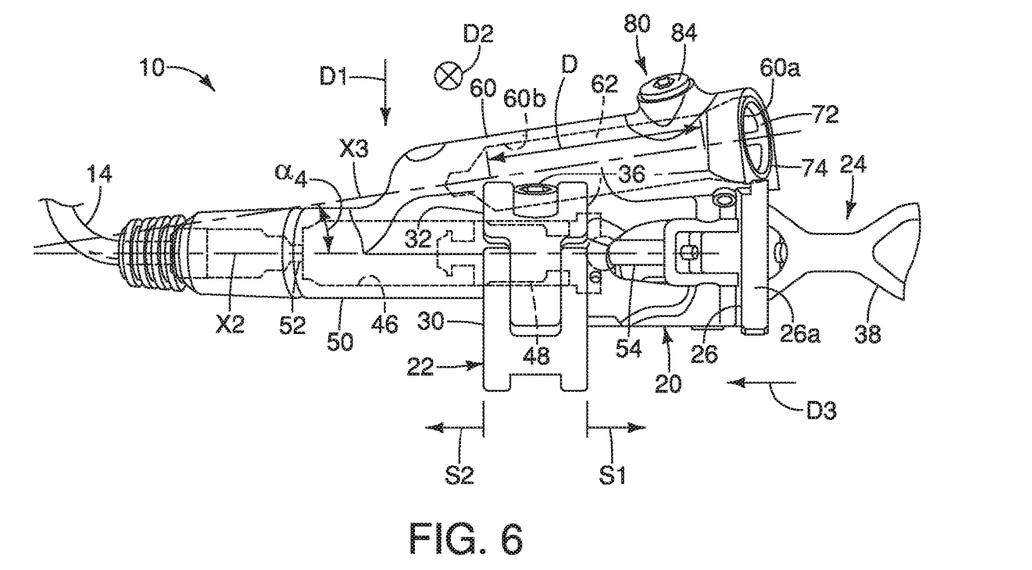
FIG. 6 is a rear side elevational view of the operating device illustrated in FIGS. 1 to 5.

The operating member 24 further includes a push or connecting rod 54 that operatively connects the lever 38 and the actuation part 42 to the piston 48. In this way, for example, the operating member 24 is coupled to the piston 48 to move the piston 48 within the cylinder bore 46. The piston 48 preferably includes a first sealing ring 56A and a second sealing ring 56B. The first and second sealing rings 56A and 56B are in sliding contact with the cylinder bore 46. The first sealing ring 56A is spaced apart from the second sealing ring 56B along the cylinder axis X2 of the cylinder bore 46. The first and second sealing rings 56A and 56B are preferably elastomeric (e.g., rubber) O-rings that each have a uniform cross-sectional profile. As seen in FIG. 6, the piston 48 at least partly overlaps the handlebar fixing structure 22 as viewed in the first perpendicular direction D2 that is perpendicular to the pivot axis P of the operating member 24. In the illustrated embodiment, the first perpendicular direction D2 is perpendicular to both the pivot axis P and the handlebar axis X1.

Figure 7:
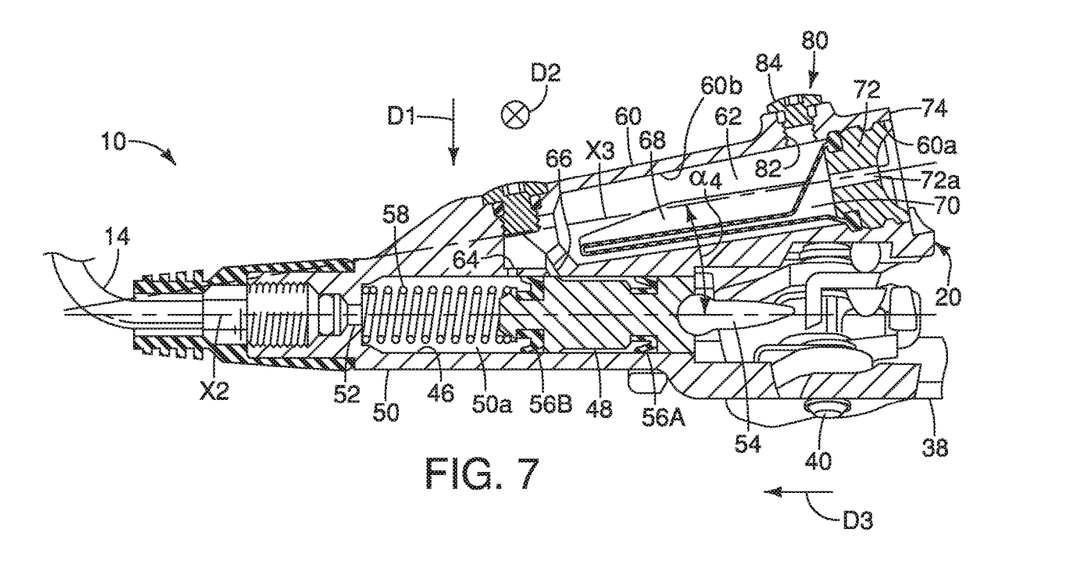
FIG. 7 is a cross-sectional view of the operating device illustrated in FIGS. 1 to 6 as taken along section plane parallel to the pivot axis of the brake operating (lever) member and passing through the cylinder axis of the cylinder bore provided in the base member.

As seen in FIGS. 4 and 7, the hydraulic operating device 10 further comprises a biasing element 58 that is disposed in the cylinder bore 46, and biases the piston 48 to a non-actuated position. Here, the biasing element 58 is a coil compression spring that biases the piston 48 to the non-actuated (rest or non-operated) position. The biasing element 58 also biases the operating member 24 to its rest position (i.e., no external force applied to the lever 38) as seen in FIGS. 4 and 7. Thus, the piston 48 compresses the biasing element 58 as the piston 48 moves in the cylinder bore 46 in response to an operation of the lever 38 of the operating member 24.

Also, in the illustrated embodiment, the hydraulic operating device 10 further comprises a hydraulic reservoir tank 60. Specifically, the base member 20 includes the hydraulic reservoir tank 60 which is in fluid communication with the cylinder 50. The hydraulic reservoir tank 60 extends along the cylinder bore 46. As seen in FIG. 3, the hydraulic reservoir tank 60 is offset with respect to the handlebar arrangement area A as view in the handlebar axis direction D3 along the handlebar axis X1 that is perpendicular to the pivot axis P of the operating member 24. In the illustrated embodiment, the second perpendicular direction (the handlebar axis direction) D3 is perpendicular to the pivot axis P and is parallel to the handlebar axis X1. As seen in FIGS. 4 and 5, the hydraulic reservoir tank 60 at least partially overlaps the handlebar arrangement area. A as viewed in the pivot axis direction D1 that is parallel to the pivot axis P of the operating member 24.

In the illustrated embodiment, the hydraulic reservoir tank 60 extends along a longitudinal axis X3. The hydraulic reservoir tank 60 at least partially overlaps the cylinder bore 46 as view in the pivot axis direction D1 that is parallel to the pivot axis P of the operating member 24. As seen in FIG. 1, the longitudinal axis X3 is angled with respect to the cylinder axis X2 with a range from 5 degrees to 25 degrees as viewed in the pivot axis direction D1. In other words, an angle α3 between the cylinder axis X2 and the longitudinal axis X3 is set with a range from three degrees to twenty-five degrees as viewed in the pivot axis direction D1. In the illustrated embodiment, the angle α3 is approximately five degrees. Moreover, as seen in FIG. 1, the longitudinal axis X3 is not perpendicular to the handlebar axis X1 of the handlebar arrangement area A as viewed in the pivot axis direction D1. Also, the longitudinal axis X3 is not parallel to the handlebar axis X1 of the handlebar arrangement area A as viewed in the pivot axis direction D1. As seen in FIG. 6, the longitudinal axis X3 is angled with respect to the cylinder axis X2 with a range from 5 degrees to 25 degrees as viewed in the direction D2. In other words, an angle α4 between the cylinder axis X2 and the longitudinal axis X3 is set with a range from 5 degrees to 25 degrees as viewed in the direction D2. In the illustrated embodiment, the angle α4 is approximately 10 degrees.

As seen in FIG. 7, the hydraulic reservoir tank 60 has a hydraulic fluid chamber 62 that is fluidly connected to the cylinder bore 46. Here, the hydraulic fluid within the hydraulic fluid chamber 62 is supplied to the cylinder bore 46 via a first fluid port 64. The first fluid port 64 opens to the cylinder bore 46 inside of a piston stroke of the piston 48. The hydraulic fluid chamber 62 is further fluidly connected to the cylinder bore 46 by a second fluid port 66 that opens to the cylinder bore 46 between the first and second sealing rings 56A and 56B. The hydraulic fluid chamber 62 constitutes a hydraulic reservoir. The hydraulic reservoir extends along the longitudinal axis X3 that is not perpendicular to the handlebar axis X1 of the handlebar arrangement area A as viewed in the pivot axis direction D1. Also, the longitudinal axis X3 of the hydraulic reservoir is not parallel to the handlebar axis X1 of the handlebar arrangement area A as viewed in the pivot axis direction D1.

As seen in FIG. 7, the hydraulic reservoir tank 60 includes a diaphragm 68 that at least partially defines the hydraulic fluid chamber 62 and an air chamber 70. Here, the hydraulic reservoir tank 60 is integrally formed with the base member 20. In this way, the hydraulic fluid chamber 62 is partially defined by the base member 20. The hydraulic reservoir tank 60 has a lid opening 60a defining a maximum width W (FIG. 3) and a reservoir bore 60b extending from the lid opening 60a. The reservoir bore 60b defines a maximum depth D (FIG. 6) that is larger than the maximum width W. The reservoir bore 60b has a cylindrical shape. As used herein the term "cylindrical shape" includes a polygonal shape. Here, the traverse cross section of the reservoir bore 60b is circular. However, the traverse cross section of the reservoir bore 60b can be polygonal such as a octagon or a rectangle. The lid opening 60a is closed off by a plug 72 disposed in the lid opening 60a. The plug 72 also retains the diaphragm 68 inside the hydraulic reservoir tank 60. Preferably, the plug 72 has an air vent 72a that fluidly communicates the air chamber 70 with outside.

As seen in FIGS. 1, 2 and 4, the hydraulic reservoir tank 60 has an end portion 74 that is closest to the handlebar axis X1. A distance L2 between the end portion 74 and the handlebar axis X1 as viewed in the pivot axis direction D1 that is parallel to the pivot axis P of the operating member 24 is equal to or smaller than 12 millimeters. Preferably, the distance L2 is equal to or smaller than 9 millimeters. In the illustrated embodiment, the distance L2 is approximately 6 millimeters. Preferably, the distance L2 is equal to or larger than 0 mm. However, the distance L2 can be minus (negative). In other words, the end portion 74 can be arranged beyond the handlebar axis X1 with respect to the pivot axis P. Also, as seen in FIG. 4, the hydraulic reservoir tank 60 (FIG. 1) is partially disposed on a first side S1 of the handlebar fixing structure 22 while the hydraulic pressure chamber 50a is disposed on a second side S2 of the handlebar fixing structure 22 as viewed in the pivot axis direction D1.

As seen in FIGS. 1, 4 and 7, the hydraulic operating device 10 further comprises a bleed valve 80 that is fluidly connected to the hydraulic fluid chamber 62 of the hydraulic reservoir tank 60. Here, the bleed valve 80 includes a threaded opening 82 and a bleed screw 84 that is threaded into the threaded opening 82. As seen in FIG. 4, the bleed valve 80 is disposed on the first side S1 of the handlebar fixing structure 22 while the hydraulic reservoir tank 60 (FIG. 1) is partly disposed on the second side S2 of the handlebar fixing, structure 22 as view in the pivot axis direction D1.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle (a small vehicle) in an upright, riding position and equipped with the hydraulic operating device. Accordingly, these directional terms, as utilized to describe the hydraulic operating device should be interpreted relative to a bicycle (a small vehicle) in an upright riding position on a horizontal surface and that is equipped with the hydraulic operating device. The terms "left" and "right" are used to indicate the "right" when referencing from the right side as viewed from the rear of the bicycle, and the "left" when referencing from the left side as viewed from the rear of the bicycle.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An operating device for a handlebar steered vehicle, the operating device comprising:
    a base member including a support abutment and a hydraulic reservoir tank, the support abutment being arranged to contact an outer surface of a handlebar while the operating device is in an installed state, the support abutment having a curved contact surface extending in a width direction of the handlebar when viewed in a handlebar axis direction parallel to a handlebar axis;
    an operating member pivotally coupled to the base member about a pivot axis;
    a handlebar fixing structure coupled to base member, the handlebar fixing structure defining a handlebar arrangement area extending along the handlebar axis, the handlebar arrangement area including a handlebar receiving area; and
    a space between the support abutment and the handlebar receiving area of the handlebar fixing structure extending in the handlebar axis direction by an axial width with a range from ten millimeters to thirty millimeters, the space extending an entire width of the handlebar receiving area in a direction perpendicular to the handlebar axis when viewed in a pivot axis direction,
    the hydraulic reservoir tank being configured to overlap an uppermost surface of the handlebar when viewed in the pivot axis direction, the hydraulic reservoir tank having a portion disposed in the space between the support abutment and the handlebar receiving area when viewed in the pivot axis direction, and the portion being disposed between the pivot axis and the handlebar when viewed in the pivot axis direction.

2. The operating device according to claim 1, wherein the handlebar receiving area of the handlebar fixing structure has an axial width with a range from ten millimeters to twenty-five millimeters as measured in the handlebar axis direction.

3. The operating device according to claim 1, wherein the support abutment has an axial width with a range from three millimeters to eight millimeters as measured in the handlebar axis direction.

4. The operating device according to claim 1, wherein the base member includes a cylinder having a cylinder bore and a piston movably disposed in the cylinder bore, and
    the operating member is operatively coupled to the piston to move the piston within the cylinder bore.

5. The operating device according to claim 4, wherein the cylinder bore has a cylinder axis that is not perpendicular to the handlebar axis of the handlebar arrangement area as viewed in a pivot axis direction parallel to the pivot axis.

6. The operating device according to claim 4, wherein the cylinder bore has a cylinder axis that is not parallel to the handlebar axis of the handlebar arrangement area as viewed in a pivot axis direction parallel to the pivot axis.

7. The operating device according to claim 4, wherein the cylinder bore has a cylinder axis that diverges from the handlebar axis to form an acute angle with the handlebar axis of the handlebar arrangement area as viewed in a pivot axis direction parallel to the pivot axis, the acute angle is in a range of five degrees to twenty-five degrees.

8. The operating device according to claim 4, wherein the cylinder defines a hydraulic pressure chamber with a space between the piston and a fluid outlet port of the cylinder, and
the hydraulic pressure chamber is entirely arranged opposite to the pivot axis with respect to the handlebar fixing structure.

9. The operating device according to claim 4, wherein the hydraulic reservoir tank is in fluid communication with the cylinder.

10. The operating device according to claim 9, wherein the hydraulic reservoir tank extends along a longitudinal axis that is not perpendicular to the handlebar axis of the handlebar arrangement area as viewed in a pivot axis direction parallel to the pivot axis.

11. The operating device according to claim 10, wherein the longitudinal axis of the hydraulic reservoir tank is not parallel to the handlebar axis of the handlebar arrangement area as viewed in the pivot axis direction.

12. The operating device according to claim 9, wherein the hydraulic reservoir tank is offset with respect to the handlebar arrangement area as viewed in the handlebar axis direction.

13. The operating device according to claim 9, wherein the hydraulic reservoir tank is at least partially overlapped with the cylinder bore as viewed in a pivot axis direction parallel to the pivot axis.

14. The operating device according to claim 1, wherein the handlebar fixing structure, the base member and the support abutment define a gap between the base member and the handlebar as viewed in a pivot axis direction parallel to the pivot axis while the operating device is in the installed state.

15. The operating device according to claim 14, wherein the gap narrows in the handlebar axis direction as the gap extends from the handlebar fixing structure towards the support abutment.

16. The operating device according to claim 1, wherein the handlebar fixing structure includes a first clamp part and a second clamp part, the first clamp part is hingedly connected to the second clamp part.

17. An operating device for a handlebar steered vehicle, the operating device comprising:
a base member including a support abutment and a hydraulic reservoir tank, the support abutment being arranged to contact an outer surface of a handlebar while the operating device is in an installed state, the support abutment having a curved contact surface extending in a width direction of the handlebar when viewed in a handlebar axis direction parallel to a handlebar axis,
an operating member pivotally coupled to the base member about a pivot axis;
a handlebar fixing structure coupled to base member, the handlebar fixing structure defining a handlebar arrangement area extending along the handlebar axis, the handlebar arrangement area including a handlebar receiving area; and
a space between the support abutment and the handlebar receiving area of the handlebar fixing structure extending in the handlebar axis direction by an axial width with a range from ten millimeters to thirty millimeters, the space extending an entire width of the handlebar receiving area in a direction perpendicular to the handlebar axis when viewed in a pivot axis direction,
the hydraulic reservoir tank being configured to overlap an uppermost surface of the handlebar when viewed in the pivot axis direction, the hydraulic reservoir tank having a portion disposed in the space between the support abutment and the handlebar receiving area when viewed in the pivot axis direction, and the portion of the hydraulic reservoir tank being disposed between the pivot axis and the handlebar when viewed in the pivot axis direction, and
the pivot axis being arranged with respect to the handlebar fixing structure to define an angle with a range from forty degrees to sixty-five degrees as measured between the handlebar axis and a line connecting the pivot axis and a center point of the handlebar receiving area and as viewed in a pivot axis direction parallel to the pivot axis.

18. The operating device according to claim 17, wherein the range of the angle is fifty-three degrees to fifty-eight degrees.

19. An operating device for a handlebar steered vehicle, the operating device comprising:
a base member including a support abutment and a hydraulic reservoir tank, the support abutment being arranged to contact an outer surface of a handlebar while the operating device is in an installed state, the support abutment having a curved contact surface extending in a width direction of the handlebar when viewed in a handlebar axis direction parallel to a handlebar axis,
an operating member pivotally coupled to the base member about a pivot axis;
a handlebar fixing structure coupled to base member, the handlebar fixing structure defining a handlebar arrangement area extending along the handlebar axis; and
a space between the support abutment and the handlebar receiving area of the handlebar fixing structure extending in the handlebar axis direction by an axial width with a range from ten millimeters to thirty millimeters, the space extending an entire width of the handlebar receiving area in a direction perpendicular to the handlebar axis when viewed in a pivot axis direction,
the hydraulic reservoir tank being configured to overlap an uppermost surface of the handlebar when viewed in the pivot axis direction, the hydraulic reservoir tank having a portion disposed in the space between the support abutment and the handlebar receiving area when viewed in the pivot axis direction, and the portion of the hydraulic reservoir tank being disposed between the pivot axis and the handlebar when viewed in the pivot axis direction, and
the pivot axis being spaced from the handlebar axis by a distance with a range from twenty-five millimeters to forty millimeters as measured in a direction perpendicular to the handlebar axis and as viewed in a pivot axis direction parallel to the pivot axis.

20. The operating device according to claim 19, wherein the range of the distance is thirty millimeters to thirty-eight millimeters.

\* \* \* \* \*